(12) United States Patent
Thomson

(10) Patent No.: US 11,419,314 B2
(45) Date of Patent: Aug. 23, 2022

(54) QUEEN BEE CAGE HOLDER APPARATUS

(71) Applicant: Brian F. Thomson, North Barrington, IL (US)

(72) Inventor: Brian F. Thomson, North Barrington, IL (US)

(*) Notice: Subject to any disclaimer, the term of this patent is extended or adjusted under 35 U.S.C. 154(b) by 0 days.

(21) Appl. No.: 17/096,032

(22) Filed: Nov. 12, 2020

(65) Prior Publication Data

US 2021/0137081 A1   May 13, 2021

Related U.S. Application Data

(60) Provisional application No. 62/934,042, filed on Nov. 12, 2019.

(51) Int. Cl.
*A01K 49/00* (2006.01)

(52) U.S. Cl.
CPC .................... *A01K 49/00* (2013.01)

(58) Field of Classification Search
CPC ....... A01K 49/00; A01K 47/06; F16M 13/022
USPC ...... 248/300, 247, 316.8, 315, 227.4, 227.1, 248/340, 339, 692; 449/7, 8, 28
See application file for complete search history.

(56) References Cited

U.S. PATENT DOCUMENTS

| 1,479,751 | A | * | 1/1924 | Smith | A01K 49/00 449/28 |
| 1,518,102 | A | | 12/1924 | Philpott | |
| 1,600,097 | A | * | 9/1926 | Crwther | A01K 49/00 449/28 |
| 1,613,752 | A | * | 1/1927 | Hinds | A01K 49/00 449/28 |
| 1,652,539 | A | * | 12/1927 | Marks | A01K 49/00 449/28 |
| 3,074,081 | A | | 1/1963 | Stallings | |
| 5,135,429 | A | | 8/1992 | Gefen et al. | |
| D377,309 | S | * | 1/1997 | Hofman | A01K 49/00 D8/372 |
| 7,410,406 | B2 | | 8/2008 | Yordy | |
| 9,930,869 | B2 | | 4/2018 | Linder et al. | |
| 2005/0056736 | A1 | * | 3/2005 | Thompson | F16L 3/133 248/58 |
| 2017/0164585 | A1 | * | 6/2017 | Cote | A01K 39/0106 |

FOREIGN PATENT DOCUMENTS

EP   1844651   10/2007

* cited by examiner

*Primary Examiner* — Brady W Frazier
*Assistant Examiner* — Zoe Tam Tran
(74) *Attorney, Agent, or Firm* — Scherrer Patent & Trademark Law, P.C.; Stephen T. Scherrer; Monique A. Morneault

(57) ABSTRACT

The present disclosure relates to relates to an apparatus for introducing a queen bee to a new or existing beehive. Specifically, the present disclosure relates to a queen bee cage or cradle holder apparatus, which is adapted for holding various sizes and shapes of cages and which suspends the queen bee in her cage securely in an ideal position within the new beehive. The apparatus is designed to easily insert and remove the queen bee cage from the beehive.

18 Claims, 2 Drawing Sheets

QUEEN BEE CAGE HOLDER APPARATUS

CROSS-REFERENCE TO RELATED APPLICATIONS

The present invention claims priority to U.S. Provisional Pat. App. No. 62/934,042, titled "Queen Bee Cage Holder Apparatus," filed Nov. 12, 2019, which is incorporated herein by reference in its entirety.

TECHNICAL FIELD

The present disclosure relates to an apparatus for introducing a queen bee to a new or existing beehive. Specifically, the present disclosure relates to a queen bee cage or cradle holder apparatus, which is adapted for holding various sizes and shapes of queen bee cages and suspends the queen bee in her cage securely in an ideal position within the new or existing beehive.

BACKGROUND

The present disclosure relates to a queen bee cage or cradle holder apparatus for securing within a beehive. When populating a new hive with bees, a queen bee must be introduced into the hive, and must remain within the hive while worker bees transform the hive into a working system by building comb. Thus, queen bee cages or cradles, where the queen bee is contained, are typically used to introduce a new queen into a new hive or into an established hive.

The queen bee cage typically comprises a wood or plastic cylinder or rectangular prism, having a screen or screens to allow interaction between the queen and her brood. On one end of the cage is an opening with a cap for introducing the queen into the cage. On the other end is a passage filled with a bee food or a sugar plug. The sugar plug provides a time-release function to the cage, because over time, worker bees eat through the sugar plug, thereby opening the passage and releasing the queen bee from the cage. The gradual release of the queen into the colony is advantageous because it gives the bees time to transform a new hive into a working colony prior to release of the queen. It also allows the colony to adapt to the odor and presence of the new queen, which means she is more likely to be accepted by the colony.

A beehive typically consists of a box filled with vertically-disposed parallel frames on which bees can build their comb. When introducing a queen within a cage to a hive, the cage is often placed in the center of the hive disposed between two parallel frames. Oftentimes, friction is used to hold the cages in the proper position. However, due to various shapes of cages, it may be difficult for the frames to hold the cages in the proper position. Sometimes the cages are tied to the frames or secured using rubber bands. However, securing the cage to the frame means a frame needs to be removed from the hive. Additionally, if a rubber band or other securing device fails, the cage can fall. Ideally, a queen cage is positioned horizontally within the center of the hive for the health of the queen and so she can easily interact with her workers. If a cage slips, it can fall to the bottom of the hive, and may be difficult to retrieve. The queen bee inside may also be damaged if the cage falls or neglected if the queen is at the bottom of the hive.

A need, therefore, exists for an improved apparatus for receiving and securing a queen bee cage within a beehive, to facilitate introducing a new queen to a hive. Specifically, a need exists for an improved apparatus adapted for receiving and holding various embodiments, sizes and shapes, of a queen bee cage within a hive, as well as for easily positioning the apparatus and cage within the hive.

Moreover, a need exists for an improved apparatus for securing the cage containing the queen bee in an ideal position within the beehive so she thrives and the hive is established.

A need further exists for an improved apparatus for securing the queen bee within her cage for enough time for the worker bees to release the queen from her enclosure.

A need further exists for an improved apparatus for securing the queen bee cage within the beehive in a secure manner so that the cage does not fall to the bottom of the hive.

A need further exists for an improved apparatus for securing a queen bee cage within the beehive for a specific amount of time so that the queen is accepted before the queen is released from her containment.

SUMMARY

The present disclosure relates to an improved apparatus for introducing a queen bee to a new or established beehive. Specifically, the present disclosure relates to a queen bee cage or cradle holder apparatus that suspends the queen bee within her cage securely and in an ideal position within the new hive. Additionally, the queen bee cage contains the queen until the hive is established, and/or when the new queen is released and accepted by the colony. The gradual introduction of the queen bee into the colony also ensures she remains with the hive. The improved apparatus achieves this goal.

To this end, in an embodiment of the present disclosure, an apparatus for securing a queen bee cage containing a new queen bee within a beehive is provided. The apparatus provides a secure hold for a queen bee cage, which can then be disposed in a proper position within the hive until the worker bees can release the queen. The apparatus is easily secured onto one of the frames within the hive, without having to disturb the frame or hive, and can be easily removed after the queen is released.

In an embodiment of the present disclosure, an apparatus for securing a queen bee cage is provided. The apparatus comprises a hook member allowing the apparatus to be suspended from a top of one of the frames. Extending from the hook is a flat vertical member on which at least one, and preferably multiple, queen bee cage holders are disposed. The apparatus is adapted for maintaining a queen bee cage in a horizontal position on a frame within the hive.

In a specific embodiment of the present invention, an apparatus for securing a queen bee cage containing a new queen bee within a beehive is provided. The apparatus comprises: a flat vertical base member having a top, a bottom, a front surface and a rear surface; a hook element extending from the top of the flat vertical base member; and a first queen bee cage receiving element extending from the front surface of the flat vertical base member, configured to hold a queen bee cage therein.

In an embodiment, the hook element is configured to extend over an edge of a beehive frame.

In an embodiment, the first queen bee cage receiving element comprises a first receiving arm extending from a first position on the flat vertical base member to a second position on the flat vertical base member.

In an embodiment, the first queen bee cage receiving element comprises a second receiving arm extending from a third position on the flat vertical base member to a fourth position on the flat vertical base member.

In an embodiment, the first receiving arm comprises a first perimeter and the second receiving arm comprises a second perimeter, wherein the first perimeter of the first receiving arm is the same as second perimeter of the second receiving arm.

In an embodiment, the first receiving arm comprises a first perimeter and the second receiving arm comprises a second perimeter, wherein the first perimeter of the first receiving arm is larger than the second perimeter of the second receiving arm.

In an embodiment, the first queen bee cage receiving element is shaped to receive a first queen bee cage of a first shape and further wherein the first queen bee cage receiving element is shaped to receive a second queen bee cage of a second shape, wherein the first shape and the second shape are different.

In an embodiment, the apparatus further comprises: an extension arm extending from a side of the flat vertical base member, wherein the extension arm is configured to hold the queen bee cage in position within first queen bee cage receiving element.

In an embodiment, the apparatus further comprises: a second queen bee cage receiving element disposed adjacent the first queen bee cage receiving element.

In an embodiment, the second queen bee cage receiving element is disposed above the first queen bee cage element.

In an embodiment, the second queen bee cage receiving element comprises a first receiving arm extending from a first position on the flat vertical base member to a second position on the flat vertical base member.

In an embodiment, the second queen bee cage receiving element comprises a second receiving arm extending from a third position on the flat vertical base member to a fourth position on the flat vertical base member.

In an embodiment, the first receiving arm has a first perimeter and the second receiving arm has a second perimeter, wherein the first perimeter is the same as the second perimeter.

In an embodiment, the first receiving arm has a first perimeter and the second receiving arm has a second perimeter, wherein the first perimeter is larger than the second perimeter.

In an embodiment, the first receiving arm and the second receiving arm are configured to hold a queen bee cage that has a tapered shape.

In an embodiment, the apparatus further comprises: an extension arm extending from a side of the flat vertical base member, wherein the extension arm is configured to hold the queen bee cage in position within second queen bee cage receiving element In an embodiment, the first queen bee cage receiving element is shaped to receive a first queen bee cage of a first shape and further wherein the first queen bee cage receiving element is shaped to receive a second queen bee cage of a second shape, wherein the first shape and the second shape are different.

In an embodiment, the first queen bee cage receiving element comprises an area of material thinner than the remainder of the first queen bee cage receiving element, wherein the area of material thinner than the remainder of the first queen bee cage receiving element is configured to be cut by a cutting device.

In an alternate embodiment of the present invention, a method of using the apparatus of is provided. The method comprises the steps of: placing a first queen bee cage of a first shape having a first queen bee therein within the first queen bee receiving element; and hooking the apparatus on a frame within a beehive.

In an embodiment, the first shape of the first queen bee cage is tapered.

In an embodiment, the method of using the apparatus further comprises the steps of: removing the first queen bee cage from the first queen bee receiving element; and placing a second queen bee cage of a second shape having a second queen bee therein within the first queen bee receiving element, wherein the second shape is different than the first shape.

It is, therefore, an advantage and objective of the present disclosure to provide an apparatus for easily securing the queen bee cage in an ideal position within a new or existing beehive, as well as easily removing the cage after the queen has entered the hive.

It is yet another advantage and objection of the present disclosure to provide an apparatus for securing the queen bee cage within the beehive in a secure manner so that the cage does not fall to the bottom of the hive.

Yet another advantage and objection of the present disclosure to provide an apparatus which is adapted for receiving and securing a variety of sizes and shapes of queen bee cages.

Additional features and advantages of the present disclosure are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present disclosure relates to an improved apparatus for introducing a new queen bee to a new or established beehive. Specifically, the present disclosure relates to a queen bee cage or cradle holder apparatus, which suspends the queen bee securely within her enclosure and in an ideal position within the new beehive. Additionally, the apparatus maintains the queen bee cage until the queen is accepted, and the queen is timely released into the hive. The acclimation period provided by the secure placement of the cage offers a better opportunity for the colony to accept and care for the new queen, while also ensuring the new queen remains with her new hive.

Now referring to the figures, FIGS. 1-4 illustrate an improved apparatus 10 for securing a queen bee cage within a beehive for introduction of a new queen bee to a new or existing hive. The apparatus can be constructed from any durable, non-toxic material, such as metal or plastic. The apparatus 10 provides for easy suspension of a queen bee cage within the beehive, as well as for easy removal when the queen has left the cage. Additionally, the apparatus 10 is designed to hold queen bee cages having a variety of configurations.

Figure 1:
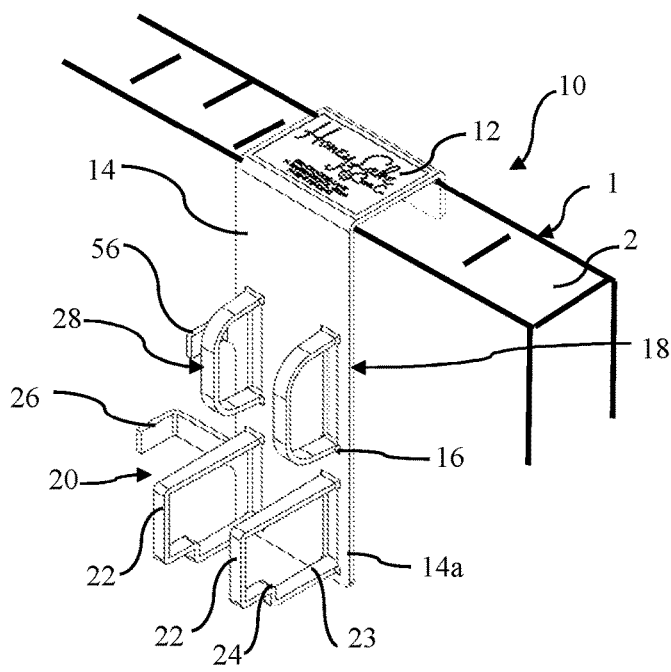
FIG. 1 illustrates a perspective view of an apparatus for receiving and securing a queen bee cage within a beehive according to the present disclosure.

As shown in FIG. 1, the apparatus 10 comprises a hook member 12, which allows the apparatus to be suspended from a frame 1 within the hive, and specifically to hook over the top 2 of the frame 1. The hook member 12 easily slips over the top 102 of the frame 1, without requiring removal of the frame from the hive enclosure. The hook member 12 also provides a secure attachment, without the need for any additional securing devices, such as a rubber band or another form of attachment.

Figure 2:
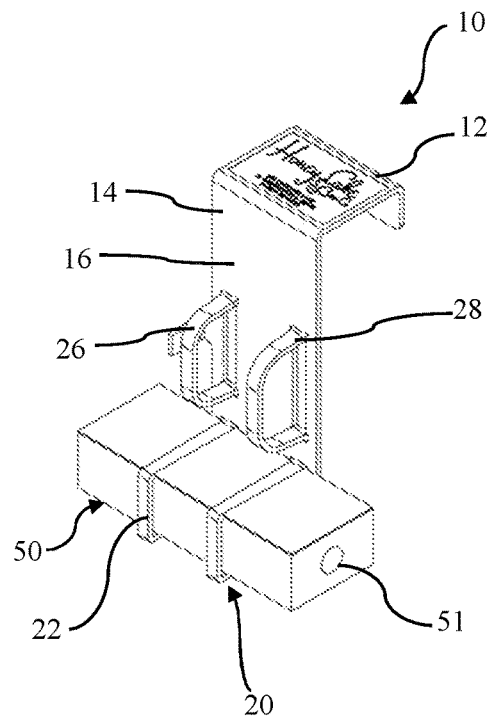
FIG. 2 illustrates a perspective view of an apparatus for receiving and securing an embodiment of a queen bee cage according to the present disclosure.
Figure 3:
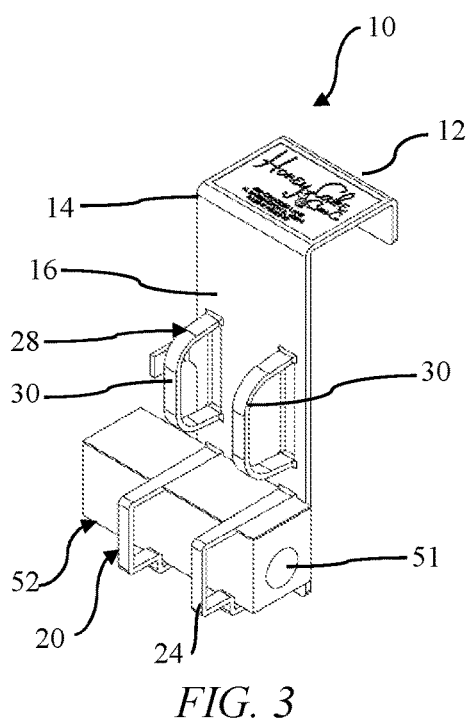
FIG. 3 illustrates a perspective view of an apparatus for receiving and securing another embodiment of a queen bee cage according to the present disclosure.
Figure 4:
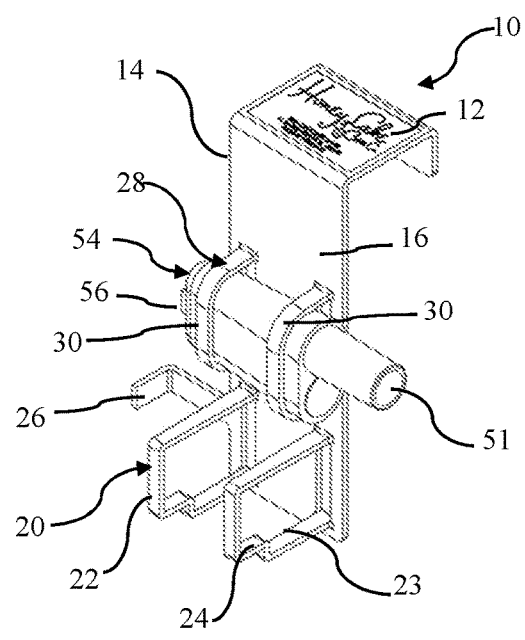
FIG. 4 illustrates a perspective view of an apparatus for receiving and securing yet another embodiment of a queen bee cage according to the present disclosure.

Extending from the hook member 12 is a flat vertical base member 14 on which at least one, and preferably multiple, queen bee cage holders 20, 28 are positioned perpendicular to and extending from the surface 16 of the flat vertical base member 14. As shown in FIG. 1, multiple cage holders 20, 28 can be positioned one on top of the other, along a length 18 of the flat member 14. The queen bee cage holder 20 may have a generally U-shaped configuration formed by two opposing receiver arms 22 attached to the surface 16 of the flat member 14. Likewise, queen bee cage holder 28 may have a generally U-shaped or C-shaped configuration formed by two opposing receiving arm 30. As shown in FIGS. 2-4, the queen bee cage holders 20, 28 have different sizes and configurations for receiving and holding cages of different shapes and sizes. Regardless of the size or shape of the queen bee cage, each cage includes a sugar plug at one end of the cage. Additionally, each cage holder 20, 28 is designed to hold the cage in a horizontal position. In this manner, the cage is easily accessible to the worker bees, who care for the queen, and maintain the queen in a healthy position.

For example, as shown in FIG. 1, at the bottom 14a or end of the flat vertical base member 14 is a first cage holder 20 formed from two opposing receivers 22 having a generally three-armed rectangular shape. The bottom arm 23 of the first cage holder further includes a lip 24 or indentation, which permits the holder to accommodate rectangular cages 50, 52 of different lengths and widths. For instance, as shown in FIG. 2, the first cage holder 20 can receive a queen bee cage 50 having a larger width and longer length, while as shown in FIG. 3, the lip 24 on the bottom arm 23 of the first cage holder 20 is configured to receive a cage 52 having a smaller width and shorter length.

Additionally, in order to accommodate queen bee cages 50, 52 of different lengths, an extension arm 26 extends horizontally out from an outer edge of the flat member 14. As shown in FIGS. 1 and 4, the extension arm 26 is designed to further secure the queen bee cage at one end.

As further shown in FIG. 4, there is a second cage holder 28 positioned above the first cage holder 20. The second cage holder 28 has two opposing receivers 30 having a slightly rounded, or C-shape configuration. This second cage holder 28 is sized to hold a special shape of queen bee cage, where the body of the queen bee cage 54 includes an extension 56 in which the sugar plug 51 is disposed. As described, the apparatus 10 of the present disclosure is meant to be universal, configured to hold nearly any type, shape and size of queen bee cage.

Figure 5:
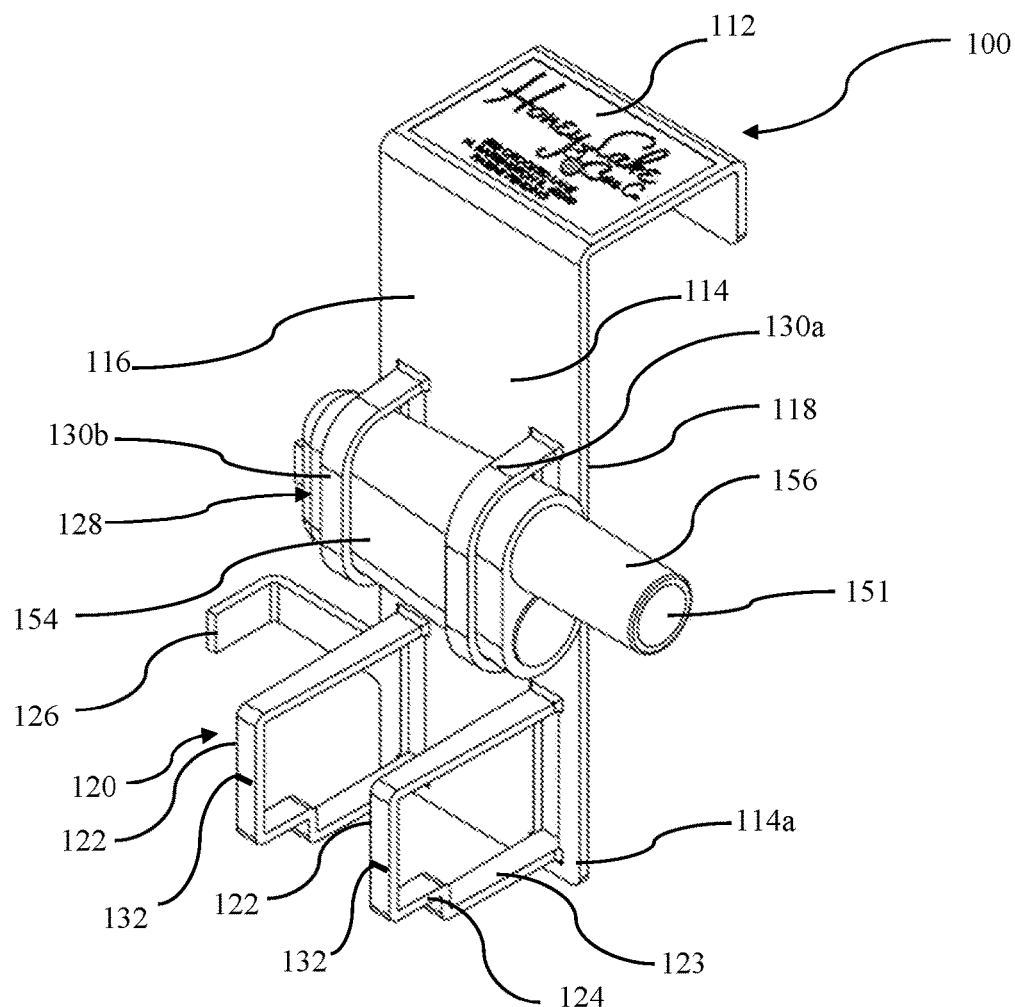
FIG. 5 illustrates a perspective view of a queen bee cage holder apparatus for receiving and securing yet another queen bee cage in an alternate embodiment of the present invention.

FIG. 5 illustrates an alternate apparatus 100 for securing one of a plurality of different sized and shaped queen bee cages within a beehive for introduction of a new queen bee to a new or existing hive. The apparatus 100 comprises a hook member 112, which allows the apparatus to be suspended from a frame within the hive, as described above with respect to apparatus 10, and specifically to hook over the top 102 of the frame 100. The hook member 112 easily slips over the top thereof, without requiring removal of the frame from the hive enclosure. The hook member 112 also provides a secure attachment, without the need for any additional securing devices, such as a rubber band or another form of attachment.

Extending from the hook member 112 is a flat vertical base member 114 on which at least one, and preferably multiple, queen bee cage holders 120 are positioned perpendicular to and extending from a front surface 116 of the flat vertical base member 114. As shown in FIG. 5, multiple cage holders 120, 128 can be positioned one on top of the other, along a length 118 of the flat member 114. The queen bee cage holder 120 has a generally U-shape confirmation formed by two opposing receiver arms 122 attached to and extending from the surface 116 of the flat vertical base member 114. As with apparatus 10 described above, apparatus 100 have queen bee cage holders 120, 128 of different sizes and configurations for receiving and holding queen bee cages of different shapes and sizes. Additionally, each cage holder 120, 128 is designed to hold a queen bee cage in a generally horizontal position. In this manner, the queen bee cage is easily accessible to the worker bees, who care for the queen, and attempt to free the queen via a sugar plug within the queen bee cage.

At the bottom 114a or end of the flat vertical base member 114 is first cage holder 120 formed from two opposing receivers 122 having a generally three-armed rectangular shape. The bottom arm 123 of the first cage holder further includes a lip 124 or indentation, which permits the holder to accommodate rectangular cages of different lengths and widths.

Second cage holder 128 positioned above the first cage holder 120. The second cage holder 128 has two opposing receiving arms 130a, 130b having a slightly rounded, or C-shape configuration, attached to and extending from the flat vertical base member 114. This second cage holder 128 is sized to hold a special shape of queen bee cage, where the body of the queen bee cage 154 includes an extension 156 in which the sugar plug 151 is disposed. The two opposing receiving arms 130a, 130b may be sized differently, to accommodate the shape and size of the queen bee cage 154, which may be tapered. Thus, receiving arm 130a may have a perimeter that is larger than the perimeter of receiving arm 130b, such that the queen bee cage 154, being tapered, may be frictionally held within the two receiving arms 130a, 130b, without requiring an extension arm that would aid in maintaining the queen bee cage in its proper position. As described, the apparatus 100 of the present disclosure is meant to be universal, configured to hold nearly any type, shape and size of queen bee cage.

Figure 6:
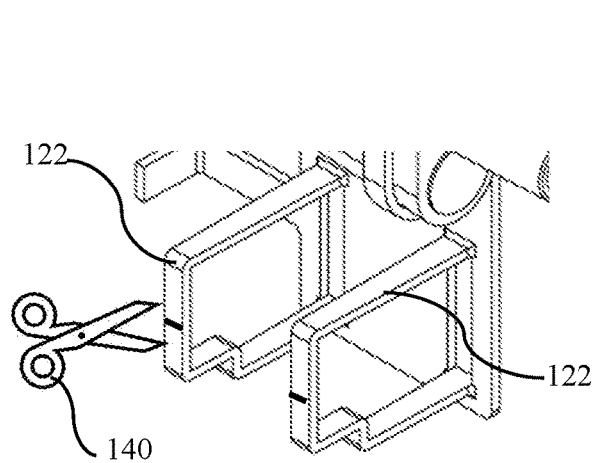
FIG. 6 illustrates a perspective view of a queen bee cage holder apparatus being enlarged in an embodiment of the present invention.
Figure 7:
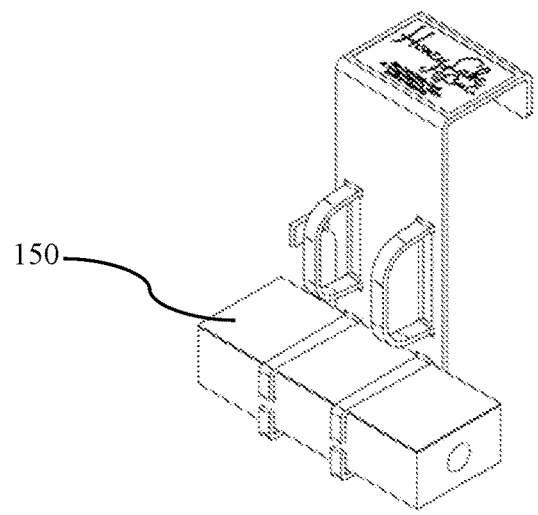
FIG. 7 illustrates a perspective view of a queen bee cage holder apparatus holding a relatively larger queen bee cage in an embodiment of the present invention.

The queen bee cage holder apparatus 10 and 100 may further allow for larger queen bee cages to be held therein. Specifically, as shown in FIG. 6, the first cage holder 120 may be cut by a cutting device, such as scissors 140 so that the two opposing receiving arms 122 may be widened to accept a relatively larger queen bee cage 150, as illustrated in FIG. 7. To facilitate the cutting of the receiving arms 122, notches 132, as illustrated in FIG. 5, or areas of relatively thinner material may be disposed within the receiving arms 122 to allow for easier cutting of the receiving arms 122 via the cutting device.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. An apparatus for securing a queen bee cage containing a new queen bee within a beehive comprises:
   a flat vertical base member having a top, a bottom, a front surface and a rear surface;
   a hook element extending from the top of the flat vertical base member and configured to extend over a top edge of a beehive frame; and
   a first queen bee cage receiving element extending from the front surface of the flat vertical base member, configured to hold a queen bee cage therein,
   wherein the first queen bee cage receiving element comprises a first arm extending as a first loop from the flat vertical base member and having a first perimeter, and a second arm extending as a second loop from the flat vertical base member and having a second perimeter, wherein the first and second arms are configured to hold a first queen bee cage having a first shape or size through the first loop of the first arm and the second loop of the second arm in a first configuration and further wherein the first and second arms are configured to hold a second queen bee cage having a second shape or size through the first loop of the first arm and the second loop of the second arm in a second configuration.

2. The apparatus of claim 1 wherein the first arm extends from a first position on the flat vertical base member to a second position on the flat vertical base member.

3. The apparatus of claim 2 wherein the second arm extends from a third position on the flat vertical base member to a fourth position on the flat vertical base member.

4. The apparatus of claim 3 wherein the first perimeter of the first arm is the same size as the second perimeter of the second arm.

5. The apparatus of claim 1 further comprising:
   an extension arm extending from a side of the flat vertical base member, wherein the extension arm is configured to hold the queen bee cage in position within first queen bee cage receiving element.

6. The apparatus of claim 1 further comprising:
   a second queen bee cage receiving element disposed adjacent the first queen bee cage receiving element.

7. The apparatus of claim 6 wherein the second queen bee cage receiving element comprises a first arm extending from a first position on the flat vertical base member to a second position on the flat vertical base member.

8. The apparatus of claim 7 wherein the second queen bee cage receiving element comprises a second receiving arm extending from a third position on the flat vertical base member to a fourth position on the flat vertical base member.

9. The apparatus of claim 7 wherein the first arm of the second queen bee cage receiving element has a first perimeter and the second arm of the second queen bee cage receiving element has a second perimeter, wherein the first perimeter is larger than the second perimeter.

10. The apparatus of claim 8 wherein the first arm and the second arm of the second queen bee cage receiving element are configured to hold a queen bee cage that has a tapered shape.

11. The apparatus of claim 6 further comprising:
    an extension arm extending from a side of the flat vertical base member, wherein the extension arm is configured to hold the queen bee cage in position within the second queen bee cage receiving element.

12. The apparatus of claim 1 wherein the first arm comprises a first area of material thinner than the remainder of the first queen bee cage receiving element, wherein the area of material thinner than the remainder of the first queen bee cage receiving element is configured to be cut by a cutting device.

13. A method of using the apparatus of claim 1 comprising the steps of:
    placing a first queen bee cage of a first shape having a first queen bee therein within the first queen bee receiving element; and
    hooking the apparatus on a frame within a beehive.

14. The method of using the apparatus of claim 13 further comprising the steps of:
    removing the first queen bee cage from the first queen bee receiving element;
    placing a second queen bee cage of a second shape having a second queen bee therein within the first queen bee receiving element, wherein the second shape is different than the first shape.

15. An apparatus for securing a queen bee cage containing a new queen bee within a beehive comprises:
    a flat vertical base member having a top, a bottom, a front surface, and a rear surface;
    a hook element extending from the top of the flat vertical base member and configured to extend over a top edge of a beehive frame; and
    a first queen bee cage receiving element extending from the front surface of the flat vertical base member, configured to hold a queen bee cage therein,
    wherein the first queen bee cage receiving element comprises a first arm extending as a first loop from the flat vertical base member and having a first perimeter, and a second arm extending as a second loop from the flat vertical base member and having a second perimeter, wherein the first perimeter is larger than the second perimeter, wherein the first and second arms are configured to hold a first queen bee cage having a tapered shape through the first loop of the first arm and the second loop of the second arm.

16. The apparatus of claim 15 wherein the first arm extends from a first position on the flat vertical base member to a second position on the flat vertical base member.

17. The apparatus of claim 16 wherein the second arm extends from a third position on the flat vertical base member to a fourth position on the flat vertical base member.

18. The apparatus of claim 15 further comprising:
    an extension arm extending from a side of the flat vertical base member, wherein the extension arm is configured to hold the queen bee cage in position within first queen bee cage receiving element.

* * * * *